United States Patent [19]

Otsuki

[11] Patent Number: 4,873,552
[45] Date of Patent: Oct. 10, 1989

[54] READER-PRINTER

[75] Inventor: Hajime Otsuki, Osaka, Japan

[73] Assignee: Minolta Camera Kabushiki Kaisha, Osaka, Japan

[21] Appl. No.: 151,520

[22] Filed: Feb. 2, 1988

[30] Foreign Application Priority Data

Feb. 2, 1987 [JP] Japan .................. 62-23222

[51] Int. Cl.⁴ .................. G03G 15/00; G03G 21/00
[52] U.S. Cl. .................. 355/271; 355/45
[58] Field of Search .................. 355/5, 7, 45

[56] References Cited

U.S. PATENT DOCUMENTS

| 4,339,182 | 7/1982 | Ueda et al. | 355/45 X |
| 4,679,927 | 7/1987 | Sogo et al. | 355/7 X |
| 4,707,109 | 11/1987 | Kanno et al. | 355/7 |
| 4,708,464 | 11/1987 | Otsuki et al. | 355/45 |
| 4,739,368 | 4/1988 | Lachut et al. | 355/7 X |
| 4,746,953 | 5/1988 | Knodt | 355/7 |

FOREIGN PATENT DOCUMENTS 5843480 3/1958 Japan .
56-110924 9/1981 Japan .
55-143467 11/1981 Japan .

Primary Examiner—Fred L. Braun
Attorney, Agent, or Firm—Burns, Doane, Swecker & Mathis

[57] ABSTRACT

A reader-printer which can print a particular image area, which is selected from a whole image projected on a screen, in a desired position on copying paper. The image area which has been selected for hard-copying from the whole image on a screen is shifted to a desired position with a desired magnification rate, permitting the printing of only the selected and shifted image in a desired size on copying paper. The reader-printer is provided with an image area specifying portion which has functions of specifying a first area to be printed on paper and specifying a second area differnt from the first area. This image area specifying portion is constituted by a transparent contact-matrix sheet which is bonded on the screen, permitting the operator to specify the first and second areas while viewing a picture image projected on the screen.

34 Claims, 11 Drawing Sheets

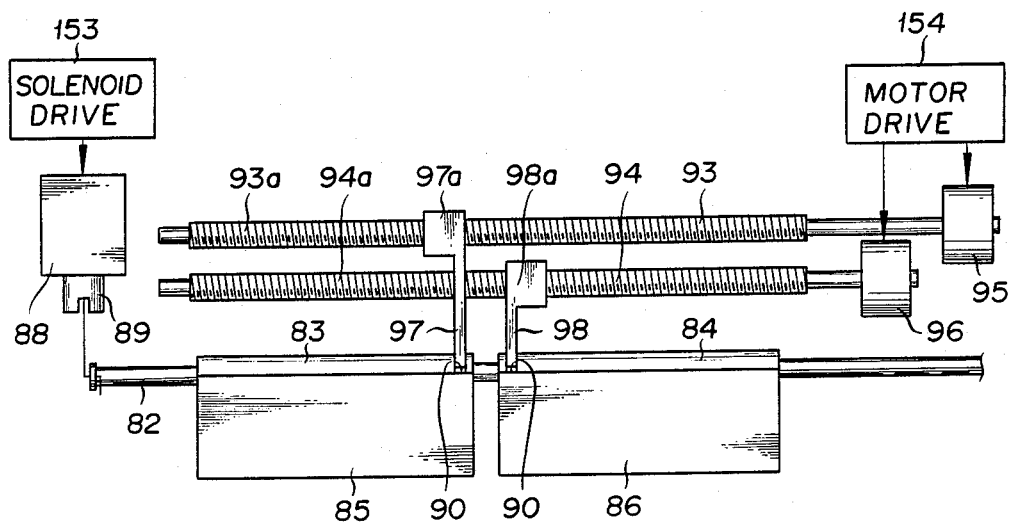
FIG. 8
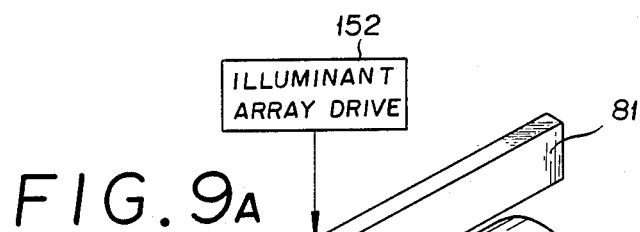
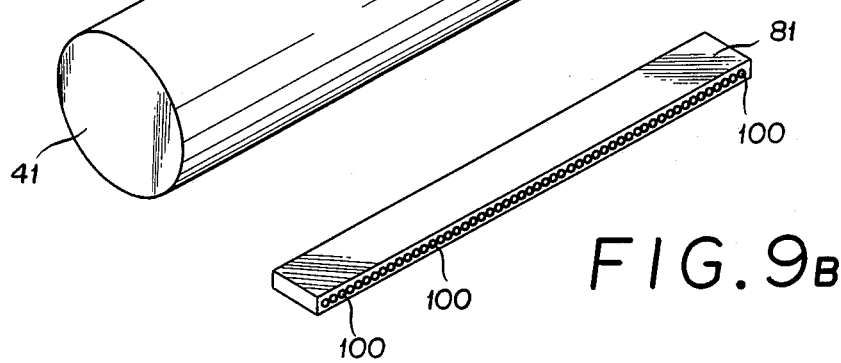
FIG. 9A
FIG. 9B

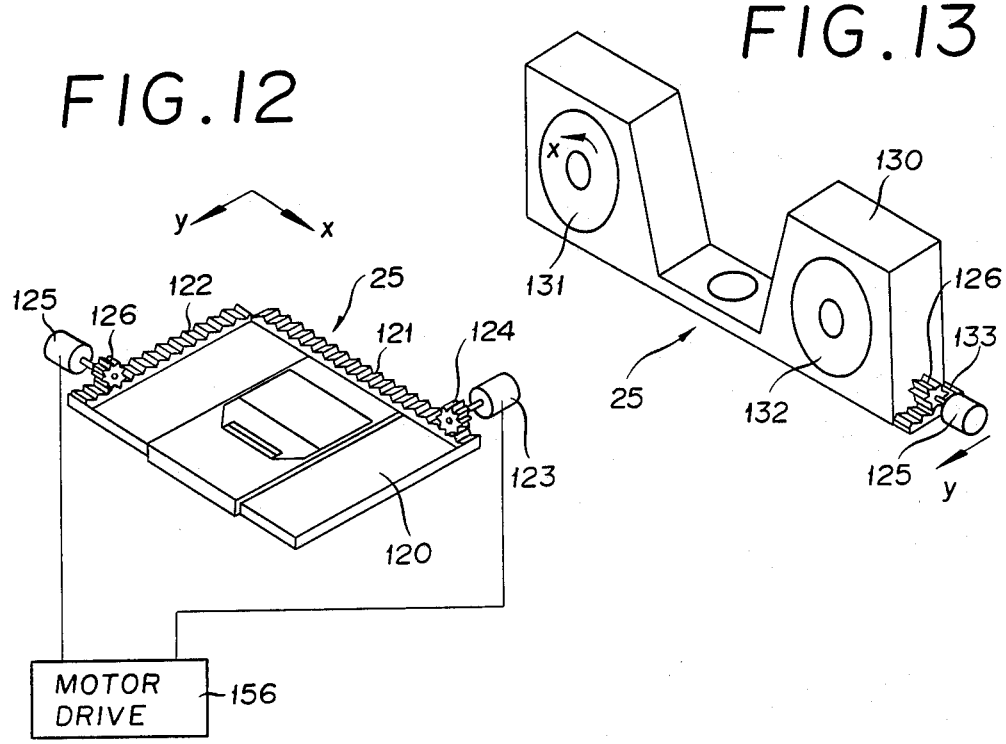
FIG.12
FIG.13
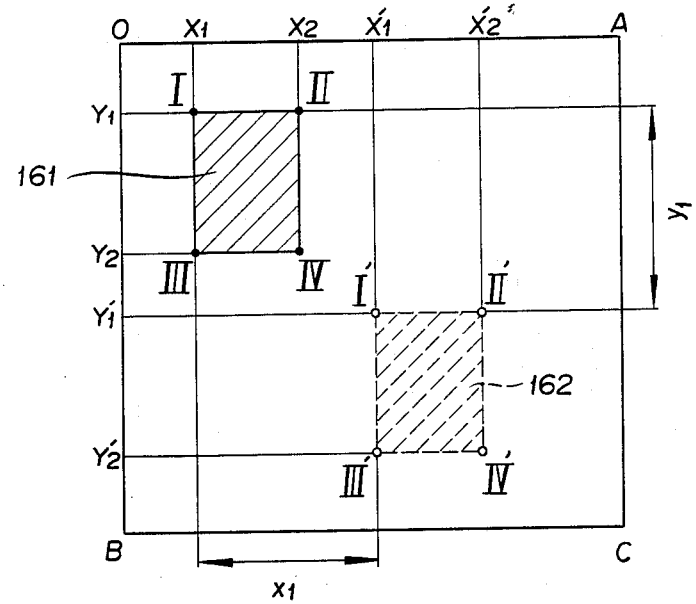
FIG.15

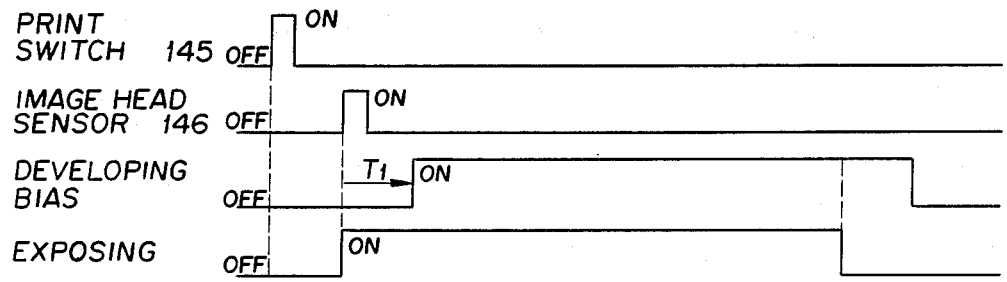
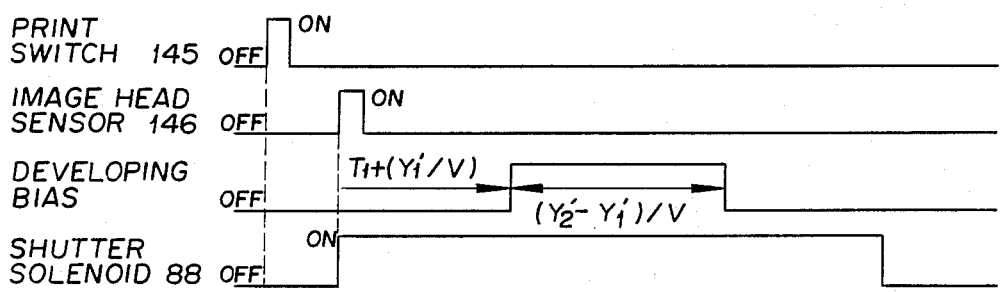
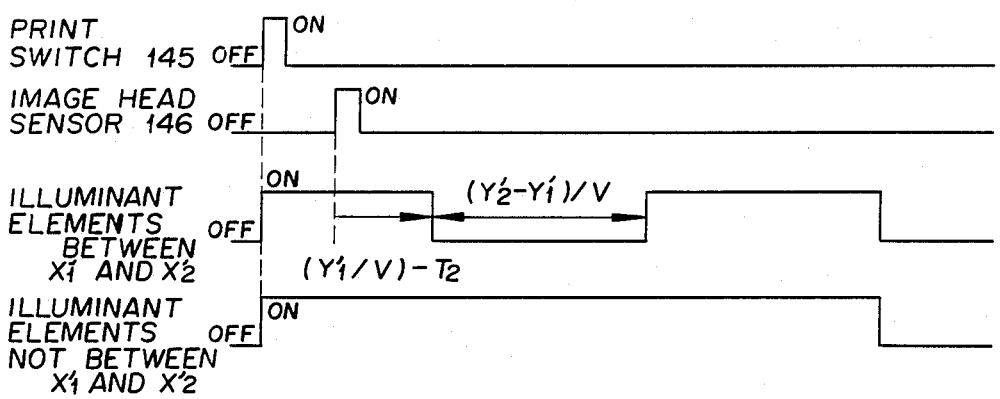

READER-PRINTER

BACKGROUND OF THE INVENTION

1. Field of the Invention

This invention relates to a reader-printer which is provided with a screen for projecting thereon an image selected from images recorded on a microfilm, and a copying unit for printing the selected image, allowing the viewing and copying of the selected image.

2. Description of the Prior Art

Recently, there is an increasing demand for reader-printers with image editing functions such as trimming and masking of copying images for the sake of confidentiality of the information recorded on a microfilm, copying only a necessary portion of the microfilm image information.

In this connection, Japanese Laid-Open Patent Specification No. 110924/1981 discloses a reader-printer employing a couple of masking plates which are located adjacent to a photosensitive drum and movable toward and away from each other. These masking plates are movable in the axial direction of the photosensitive drum, and interlocked with an indicator plate which indicates a portion corresponding to a copying region of the screen. This reader-printer is capable of trimming a picture image but incapable of transferring the picture image to a desired position on paper. Especially, in a case where it is desired to copy a part of images which are recorded on a microfiche film in a grid-like fashion, an image which is in an end position on the screen is copied in a deviated position close to a paper end, which is difficult to view.

SUMMARY OF THE INVENTION

It is a primary object of the invention to provide a reader-printer which can shift a microfilm in longitudinal and transverse directions to shift a first image area specifically selected for print-out on paper from an image projected on the screen, correspondingly to a second area specified separately from the first image area.

It is another object of the invention to provide a reader-printer which can project on a photosensitive medium a first image area specified for print-out on paper out of an image projected on the screen with a shift to a position of a second area specified separately from the first area, thereby forming only the image of the first area on a desired position of paper.

It is still another object of the invention to provide a reader-printer with a zoom projection lens, which can project an image on the photosensitive medium in an arbitrary size with a shift from the first area to the second area, thereby forming only the image of the arbitrary size on paper.

It is a further object of the invention to provide a reader-printer, employing a contact-in-built sheet of transparent material which is bonded on the screen to provide means for specify the above-mentioned first and second areas.

In accordance with the present invention there is provided a reader-printer of the type which is adapted to project a recorded image of a microfilm on a screen and to print the image on paper by projecting same on a photosensitive medium, said reader-printer comprising: a first specifying means for specifying a first image area to be printed on paper, from an image projected on said screen; a second specifying means for specifying a second area located in a position different from that of said first area specified by said first specifying means; a detection means for detecting the positional relationship between said first and second areas; a shift means for shifting the image of said microfilm in the longitudinal and transverse directions of said paper according to the results of operation of said detection means; and means for forming said image on said paper selectively in a position corresponding to said second area.

Further in accordance with the present invention there is provided a reader-printer of the type which is adapted to project a recorded image of a microfilm on a screen and to print the image on paper by projecting same on a photosensitive medium, said reader-printer comprising: a transparent coordinate input means mounted on the front side of said screen and adapted to produce coordinate signals corresponding to pressed positions; an area setting means operable in a first mode of setting a first area of a projected image on said screen according to said coordinate signals from said coordinate input means and a second mode of setting a second area for forming an image on paper; means for specifying the mode of said area setting means; means for detecting the positional relationship between said first and second areas; a shift means for shifting the , image of said microfilm in the longitudinal and transverse directions of said paper according to the results of operation of said detecting means; and means for forming said image on said paper selectively in a position corresponding to said second area.

BRIEF DESCRIPTION OF THE DRAWINGS

In the accompanying drawings:

FIG. 8 is a plan view of the shutter unit of FIG. 7;

FIG. 9A is a perspective view showing the positional relationship between an array of light emitting elements and a photosensitive drum;

FIG. 9B is a perspective view showing front end of the array of light emitting elements of FIG. 9A;

FIG 12 is a perspective view of a film carrier assembled into the reader-printer body;

FIG. 13 is a perspective view of a film carrier of a different type;

FIG. 15 is a schematic illustration showing the procedures for setting the first and second areas;

FIG. 17A is a time chart indicative of the control operations in a normal copying operation without image editing;

FIG. 17B is a time chart indicative of the control operations in an N-P copying operation with image editing; and FIG. 17C is a time chart indicative of the control operations in a P-P copying operation with image editing.

DESCRIPTION OF THE PREFERRED EMBODIMENTS

Figure 1:
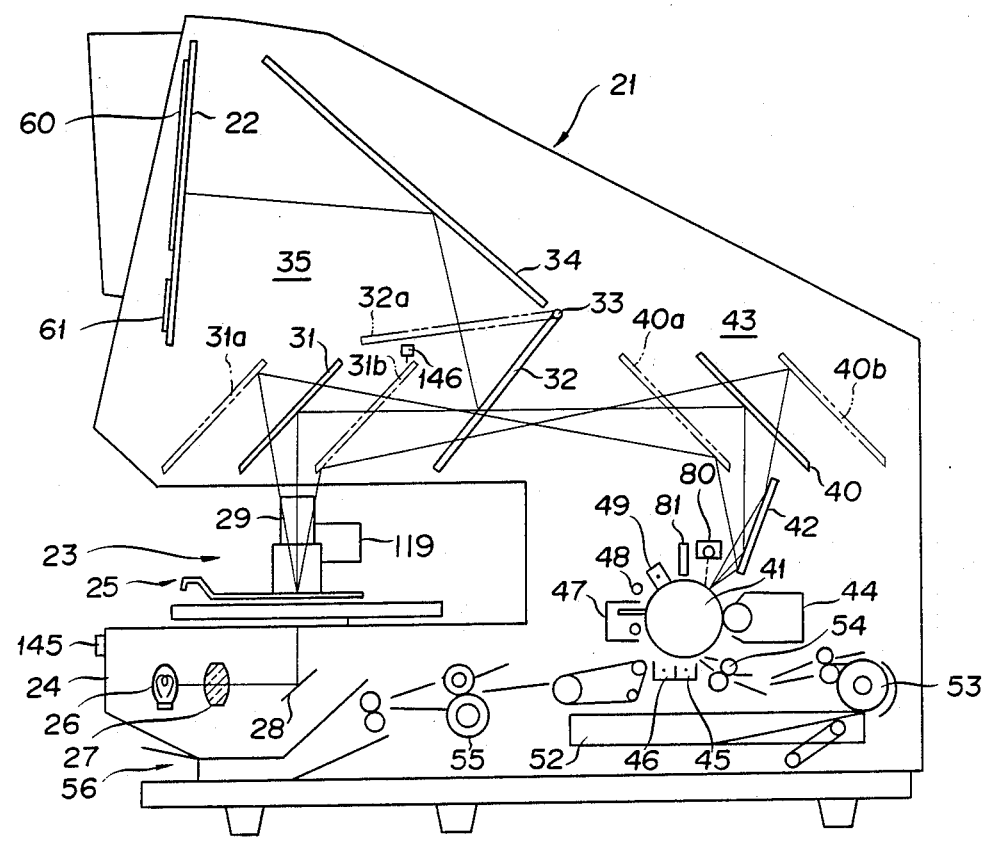
FIG. 1 is a sectional view of a reader-printer according to the present invention, showing its internal construction.

Referring to FIG. 1, there is shown the internal construction of a reader-printer embodying the present invention. As shown, a screen 22 is provided in an upper portion on the front side of a reader-printer body 21, and a recess 23 is formed under the screen 22. Provided under this recess 23 is a control panel 24 on which a microfilm carrier 25 is mounted to support a microfilm thereon. The microfilm which is supported on the carrier 25 is illuminated with light from a light source 26, which is provided within the control panel 24, through a condenser lens 27 and a mirror 28. A zoom projection lens 29 is located above the microfilm carrier 25 to project the recorded image of the microfilm toward an upper inner portion of the reader-printer body 21.

Provided within the reader-printer body 21 area: a first mirror 31 which is illuminated with the light path of the optical image projected through the zoom projection lens 29; a second mirror 32 which is rotatable about a shaft 33 and illuminated with the light path of the optical image reflected from the first mirror 31 when used in a reader position indicated by solid line; and a third mirror 34 which is illuminated with the light path of the optical image reflected from the second mirror 32 to reflect the image toward the screen 22. The projected light path from the zoom projection lens 29 is directed to the screen 22 by these mirrors 31, 32, and 34 to form a reader optical system 35.

A fourth mirror 40 is provided within the reader-printer body 21 opposingly at a predetermined distance from the first mirror 31. If the second mirror 32, which is rotatable about the shaft 33, is retracted into the position which is indicated by phantom line labelled with reference numeral 32a, the optical image reflected by the first mirror 31 is directed to the fourth mirror 40 and thereby reflected toward a photosensitive drum 41 which is horizontally mounted within the reader-printer body 21, projecting the optical image on the photosensitive drum 41 through a fifth mirror 42 interposed between the fourth mirror 40 and the drum 41. The light path from the first mirror 31 to the mirrors 40 and 42 forms a mirrors scan type printer optical system 43 to expose the photosensitive drum 41 to slit light.

The first and fourth mirrors 31 and 40 are mounted on a movable plate which is not shown, moving them in synchronism with each other between the positions indicated at 31a and 40a and positions indicated at 31b and 40b, respectively, maintaining a constant light path length therebetween. Consequently, the printer optical system 43 is put in scanning action back and forth in the printer body 21 in printing operations.

A developer 44 is mounted within the reader-printer body 21 in a position adjacent the photosensitive drum 41 for depositing toner on the electrostatic latent image formed on the photosensitive drum 41. Mounted within the body 21 in positions below the photosensitive drum 41 are a transfer charger 45 for transferring the toner to copying paper and a separating charger 46 for separating the copying paper from the photosensitive drum 41. The toner which remains on the outer peripheral surface of the photosensitive drum 41 after the transfer of the toner image onto the copying paper is removed by a cleaner 47. Further mounted within the body 21 in positions over the photosensitive drum 41 are an eraser lamp 48 and a charger 49.

A paper feeder 52 is provided beneath the photosensitive drum 41 to accommodate copying paper to be fed to a timing roller 54 by means of a paper feed roller 53. The timing of feeding copying paper to the transfer charger 45 is controlled by the just-mentioned timing roller 54. The copying paper is fed to between the photosensitive drum 41 and the transfer charger 45 by the timing roller 54, to transfer the toner image formed on the outer peripheral surface of the photosensitive drum 41 onto the copying paper. The copying paper which bears the transferred toner image is separated from the photosensitive drum 41 by AC discharge of the separating charger 46 and due to stiffness of the copying paper itself. A fixing device 55 is provided downstream of the separating charger 46 for thermally fixing the transferred toner on the copying paper. A paper outlet 56 is provided in a lower portion of the front end of the control panel 24 for discharging the fixed copying paper out of the reader-printer body 21.

Bonded on the front side of the screen 22, shown in FIG. 1, is an area specifying member 60 which specifies a first area of a specific range in a whole picture image which is projected on the screen 22, together with a second area different and shifted from the first area. Also bonded on the front side of the screen 22 is an input portion 61 which is composed of a plural number of switches and operated at the time of image editing.

Figure 2:
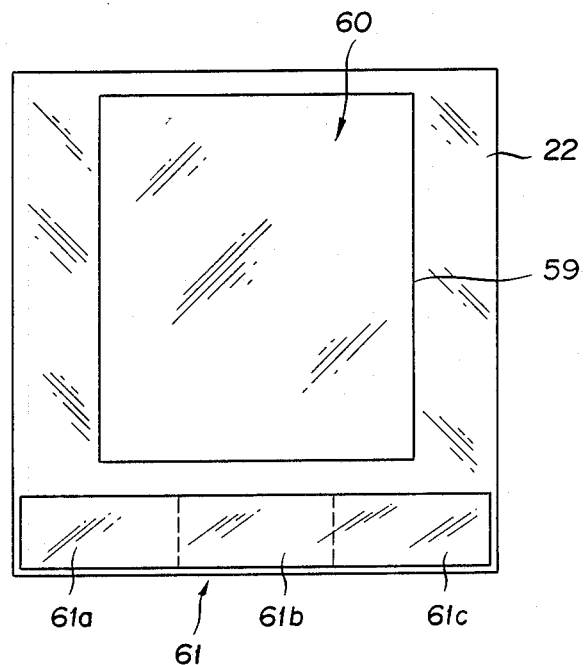
FIG. 2 is a front view of a screen provided on the reader-printer of FIG. 1.

FIG. 2 shows the front side of the screen 22 with the above-mentioned area specifying member 60 which is constituted by a contact inbuilt transparent sheet 59 and bonded in a position where the microfilm image is projected. The input portion 61 is bonded on a lower end portion of the screen 22.

Figure 3:
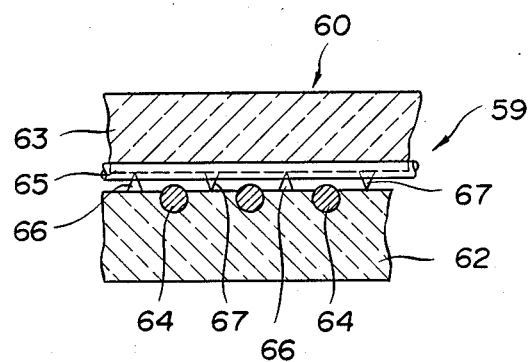
FIG. 3 is a sectional elevation of an area specifying member which consists of a transparent contact-matrix sheet with inbuilt contacts as shown in FIG. 2.

FIG. 3 shows part of the above-mentioned sheet 59 which constitutes the image area specifying portion 60, the sheet 59 and having a couple of transparent sheets 62 and 63 with built-in contacts, each sheets consisting of a transparent polycarbonate film as shown particularly in FIG. 3. Embedded on the inner side of the transparent sheet 62 are a plural number of ultrafine wires 64 of stainless steel or other metal at a pitch of 1 mm and parallel with the vertical sides of the screen 22. Each one of the ultrafine wires 64 is protruded 2-5μm from the inner surface of the transparent sheet 62. Similarly, a large number of ultrafine wires 65 are embedded on the inner side of the other transparent sheet 63 in the transverse direction of the screen at the same pitch as the ultrafine wires 64, and protruded from the inner surface of the transparent sheet 63 by the same dimension.

These transparent sheets 62 and 63 are overlapped such that their surfaces with the ultrafine wires in exposed state are disposed on the inner surface and the ultrafine wires 64 and 65 are perpendicularly intersected with each other. A large number of resiliently deformable spacers 66 are provided at predetermined intervals on the inner surface of the transparent sheet 62 with their tip ends in contact with the transparent sheet 63 to keep the ultrafine wires 64 and 65 normally out of contact with each other. Similarly, a large number of resiliently defoarmable spacers 67 are provided at predetermined intervals on the inner surface of the transparent sheet 63 with their tip ends in contact with the transparent sheet 62.

Figure 4:
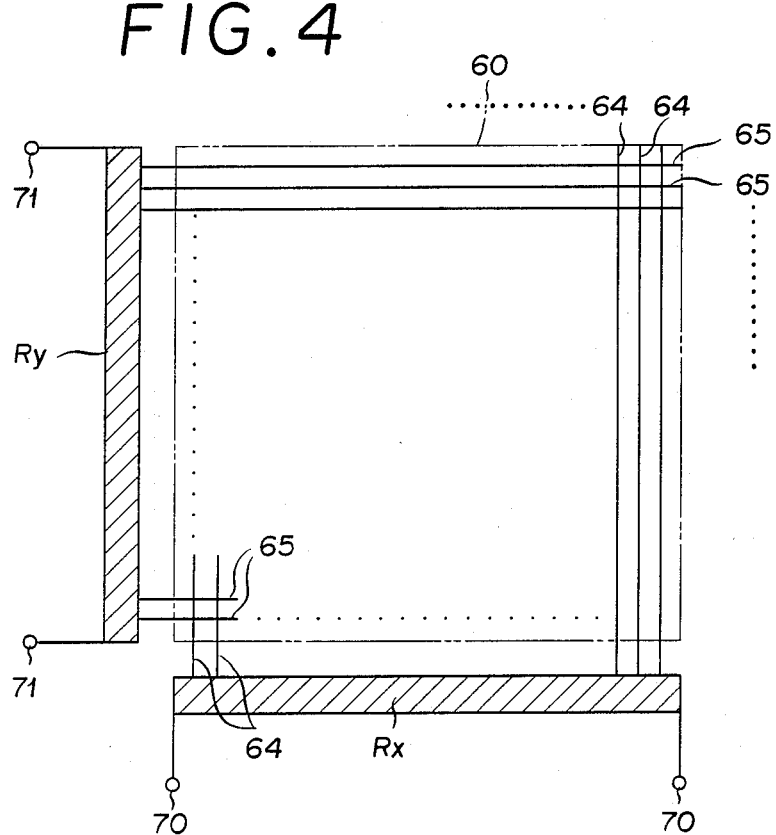
FIG. 4 is a schematic illustration of the internal construction of the contact-matrix sheet.

FIG. 4 illustrates the ultrafine wires 64 and 65 which are incorporated into the contact sheet 59. The ultrafine wires 64 are arranged in a predetermined pitch in the X-derection, namely, in the horizontal direction of the screen 22 and each connected at one end to a resistor Rx. On the other hand, the ultrafine wires 65 are arranged in a predetermined pitch in the Y-direction, namely, in the vertical direction of the screen 22. The ultrafine wires 64 and 65 are crossed in a pitch of 1 mm and normally held out of contact with each other. When the outer surface of the transparent sheet 62 is pressed with a point pen or the like, the ultrafine wires at the pressed point are contacted with each other. It follows that a matrix-like contact system is formed on the image specifying portion of the sheet 59 in a pitch of 1 mm.

Figure 5:
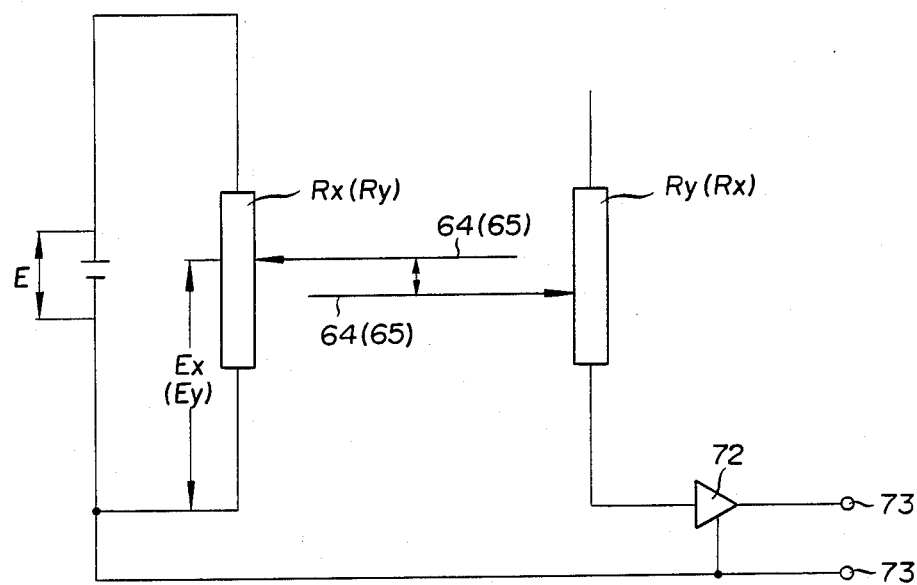
FIG. 5 is a circuit diagram explaining the principles of detection of positions by the contact inbuilt sheet of transparent material.

Referring to FIG. 5, there is diagrammatically shown the basic construction of the position detecting circuit for locating the position which is pressed with a point pen or the like. For detecting the position in the X-direction, a voltage E is applied across the opposite terminals 70 of resistor Rx, while holding the opposite terminals of resistor Ry in open state. Then, by rendering a high input impedance buffer 72 conductive to one terminal of the resistor Ry, a voltage Ex proportional to the position in the X-direction is obtained across the terminals 73 of the position detecting circuit. For detecting the position in the Y-direction, a voltage E is applied across the terminals of the resistor Ry, while holding the terminals of the resistor Rx in open state. Then, one can obtain voltage Ey by rendering the high input impedance buffer 72 conductive to one terminal of the resistor Rx.

Figure 6:
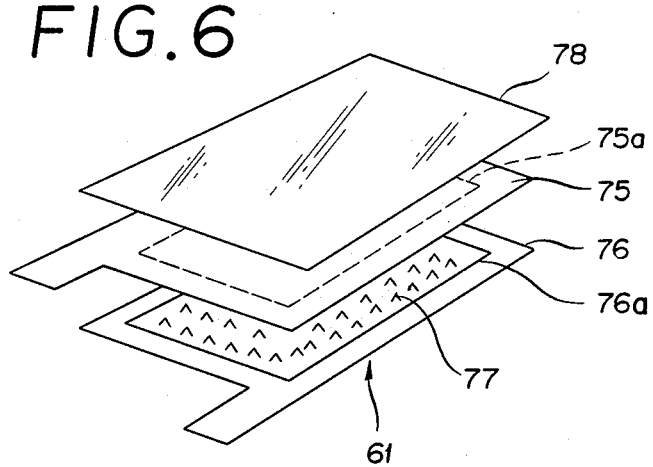
FIG. 6 is an exploded perspective view of the resistor sheet construction shown in FIG. 2.

The input portion 61 which is provided at the lower end of the screen 22 is constituted by a resistor sheet, which consists of, as shown in FIG. 6, a first film 75 having a resistor film 75a adhered to the inner surface thereof, and a second film 76 having a resistor film 76a adhered to the inner surface thereof. These two films 75 and 76 are overlapped one on the other through a multitude of spacers which are projected on one or both of the opposing surfaces of the resistor films 75a and 76a. A protective sheet 78 is bonded on the outer surface of the first film 75 for the purpose of protection thereof. Accordingly, by pressing the protective sheet 78, the resistor films 75a and 76a are contacted with each other, providing a switch action. The films 75 and 76, resistor films 75a and 76a, and protective film 78 may be formed of transparent material if desired.

It is also possible to form the contact sheet 59 by the use of the above-mentioned transparent resistor film. In a case where such a resistor sheet is used for detection of the position of a specified area, a constant current is passed through the resistor film, reading a voltage drop at a contacted point, which is caused by a touch or the like, and producing an output of a voltage corresponding to the coordinates of that point to detect its location in terms of its coordinates.

As shown particularly in FIG. 2, the input portion 61 is provided with three input sections 61a, 61b and 61c. When any one of these sections of the input portion 61 is pressed, it can be detected by reading a voltage drop in the resistor films 75a and 76a through which a constant current is passed as mentioned hereinbefore. The first input section 61a is pressed, for example, for input of a signal of coordinates of the image position in an editing operation. The second section 61 is used for specifying the edited image position copying paper, that is to say, for shifting the image position, pressing it after specifying a shifting area of the image projected on the screen 22. It is possible to specify another shifting area by pressing the second section 61b again. The third section 61c is pressed for specifying an editing mode of "trimming" or "masking" when a positive microfilm is used, thereby switching the editing mode from "trimming" to "masking" or vice versa. The editing mode "trimming" or "masking" is indicated by lighting a LED or the like on an indicator which is not shown in the drawing.

As shown in FIG. 1, a shutter unit 80 and an illuminant array 81 are mounted within the reader-printer body 21 in positions around the photosensitive drum 41. The shutter unit 80 is used for a trimming operation in case a positive copy image is produced from a negative microfilm (hreinafter referred to as "N - P case").

Figure 7:
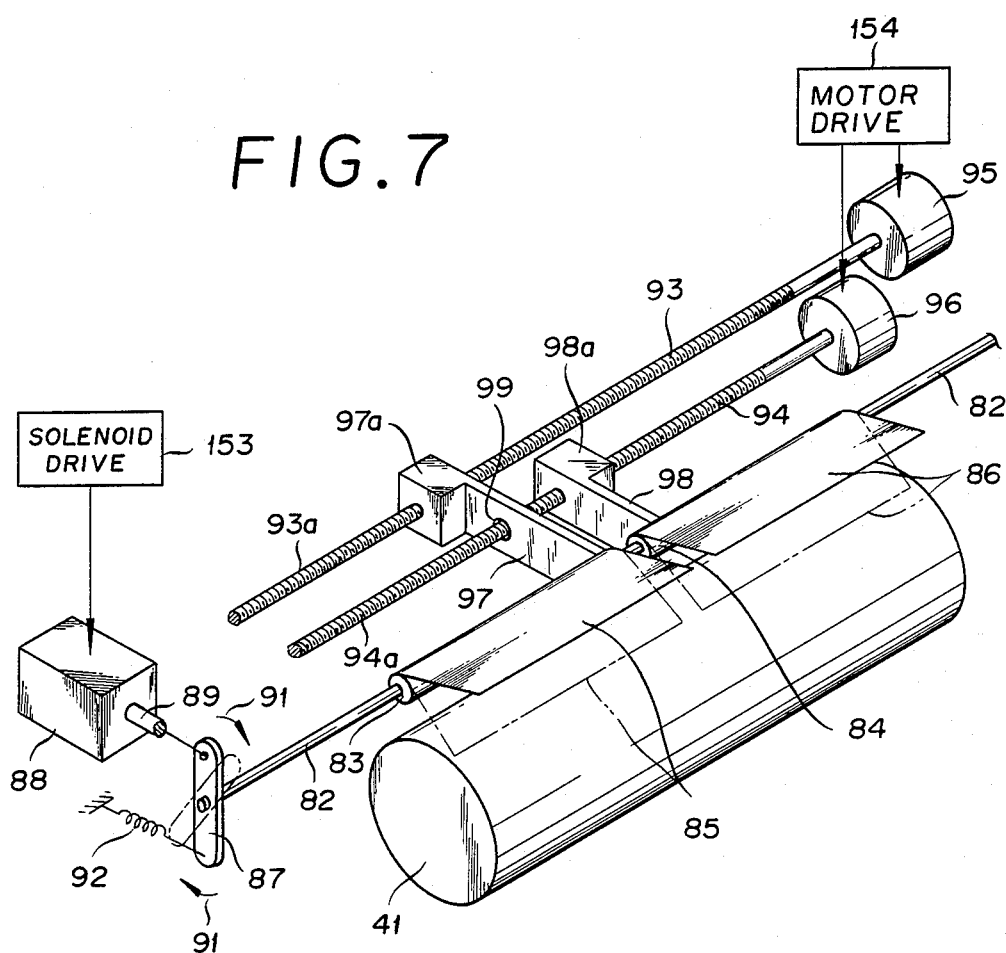
FIG. 7 is a perspective view of the shutter unit shown in FIG. 1.

As seen in FIGS. 7 and 8 which illustrate the abovementioned shutter unit 80, a guide rod 82 is mounted adjacent to the photosensitive drum in parallel relation with the rotational axis of the latter. The guide rod 82 is rotatably supported by a bearing which is mounted within the reader-printer body 21 though not shown. A couple of hollow sleeves 83 and 84 which are fitted on the guide rod 82 are axially slidable but not rotatable relative to the guide rod 82. Shutters 85 and 86 are fixed on the sleeves 83 and 84, respectively, for masking scanning light projected on the photosensitive drum 41.

A lever 87 is fixed to the guide rod 82 at its center portion for rotating the shutters 85 and 86 between a position for masking the scanning light to be projected on the photosensitive drum 41 as shown in FIG. 7 and a position for exposing the scanning light to the photosensitive drum 41 as shown by phantom line in the same figure. One end of the lever 87 is connected to a plunger 89 which is reciprocal by means of a solenoid 88, and the other end is connected to a spring 92 which acts to bias the lever 87 in the direction of arrow 91. Accordingly, when the solenoid 88 is de-energized state, the lever 87 is rotated to the position of phantom line by the action of the spring 92, rotating the shutters 85 and 86 to the respective exposing positions indicated by phantom line in FIG. 7. Conversely, if the solenoid 88 is energized, the lever 87 and the shutters 85 and 86 are turned to the masking positions shown in FIG. 7.

A couple of screw shafts 93 and 94 are mounted adjacent to the guide rod 82 in parallel relation with the latter. These screw shafts 93 and 94 are rotatably supported by bearings which are mounted in the reader-printer body 21 though not shown. An end portion of the screw shaft 93 is connected to the output shaft of a step motor 95 thereby to drive the screw shaft 93. An end portion of the screw shaft 94 is connected to the output shaft of a step motor 96 thereby to drive the screw shaft 94.

For sliding the shutter 85 along the guide rod 82, the fore end of an arm 97 which has its base end portion 97a threadedly engaged with a male screw portion 93a of the screw shaft 93 is engaged with the sleeve 83. A hole 99 is bored in a center portion of the arm 97, the hole 99 having a greater inside diameter than the screw shaft 94 for passing the latter. For sliding the shutter 86 along the guide rod 82, the fore end of an arm 98 which has its base end portion 98a threadedly engaged with a male screw portion 94a of the screw shaft 94 is engaged with the sleeve 84. The engagement between the arm 97 and the sleeve 83 as well as the engagement between the arm 98 and the sleeve 84 is established through a groove 90 which is formed on each one of the sleeves 83 and 84 as shown in FIG. 8. Consequently, upon turning the guide rod 82 by the driving force of the solenoid 88, the shutters 85 and 86 are permitted to turn about the guide rod 82, with the arms 97 and 98 held in engagement with the sleeves 83 and 84, respectively. By actuating the step motors 95 and 96, the shutters 85 and 86 are moved parallel with the center axis of the photosensitive drum 41 through the arms 97 and 98, thereby setting the position and range of blockage of the light to be projected on the photosensitive drum 41.

FIG. 9A illustrates on an enlarged scale the illuminant element array shown in FIG. 1. The illuminant element array 1 is mounted in the reader-printer body 21 along the photosensitive drum 41 by fixing means which is not shown. On the side which faces the photosensitive drum 41, the illuminant element array 81 has a row of a large number of illuminant elements 100 such as light emitting diodes or the like over a length substantially same as that of the photosensitive drum 41. The respective illuminant elements 100 are turned on and off to partially illuminate the photosensitive drum 41 for trimming or masking the image in a case where a positive copy image is produced from a positive microfilm (herein after referred to as "P-P case").

Figure 10:
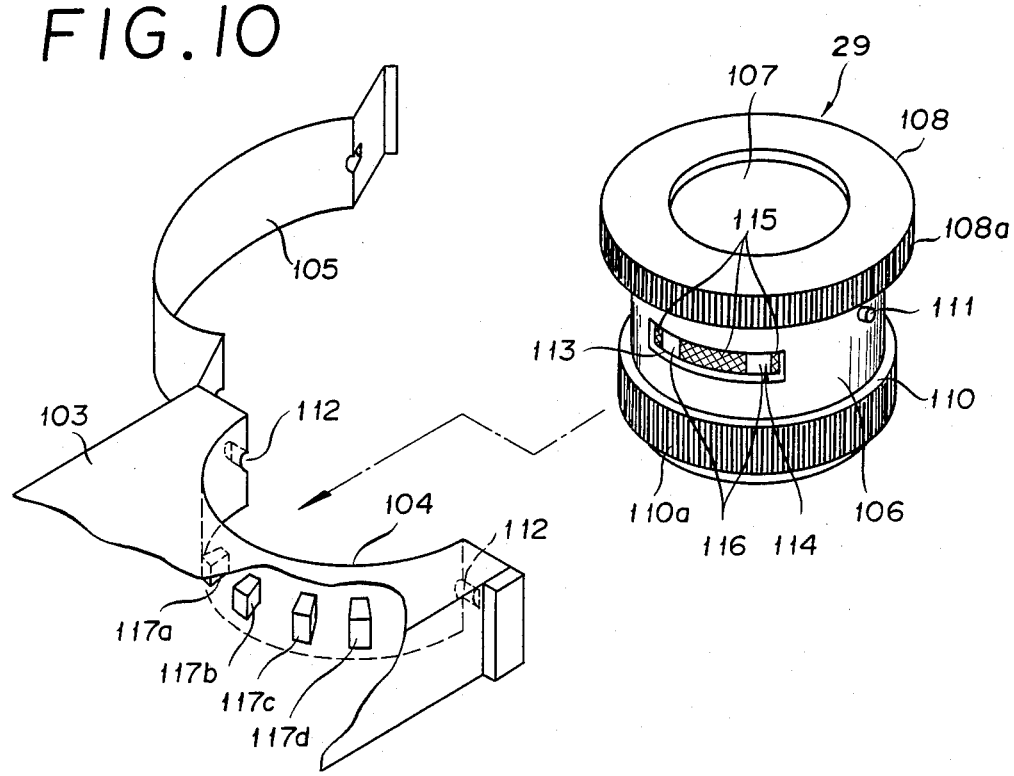
FIG. 10 is an enlarged perspective view showing the details of a zoom projection lens construction.
Figure 11:
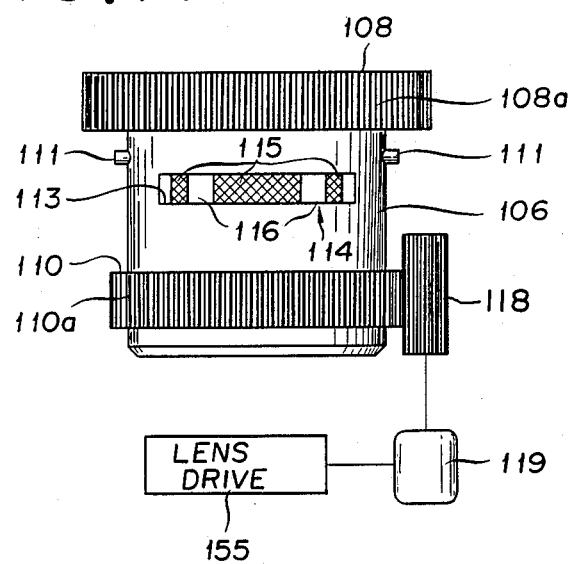
FIG. 11 is a front view of the zoom projection lens of FIG. 10.

Referring to FIGS. 10 and 11, there are shown details of the zoom projection lens 29 of FIG. 1. The zoom projection lens 29 is mounted by a clamp member 105 in a semicircular recess 104 of a lens holder 103 which is fixed to the reader-printer body 21. A focussing ring 108 with a focussing lens assembly 107 consisting of a plural number of lenses is helically rotatably mounted on an upper portion of cylindrical body 106 of the zoom projection lens 29, while a zoom ring 110 with a zoom lens assembly (not shown) consisting of a plural number of lenses is helically rotatably mounted on a lower portion of the body 106. A toothed wheel 108a is provided to the outer peripheral surface of the focussing ring 108, so as to rotate the focussing ring 108. A couple of projections 111 are provided on the circumferential surface of the body 106, which projections 111 are engageable with grooves 112 in the lens holder 103 for determining the position of the zoom projection lens 29 when mounting same on the lens holder 103. In order to change the lens magnification rate, a toothed wheel 110a is provided to the outer peripheral surface of the zoom ring 110, and a toothed wheel 118 driven by a motor 119 is meshed with the toothed wheel 110a.

Disposed in an opening 113, which is formed on the body 106, is an index mark 114 which is bonded on the outer periphery of an inner cylinder (not shown) of the zoom ring 110. The index mark 114 consists of light-absorbing portions 115 and reflecting portions 116, and is rotated to change its phase in relation with image magnifying actions, namely, rotated integrally with the zoom ring which is rotated for the zooming action. In order to detect such variations in phase, four photosensors 117a to 117d are mounted in exposed state in recesses 104 on the lens holder 103. A number of stepwise magnification signals are obtained from various combinations of binary signals detected by these photosensors.

FIG. 12 illustrates the microfilm carrier 25 which supports a microfiche film. The carrier body 120 is mounted on the top surface of the control panel 24 shown in FIG. 1, and movable in two perpendicularly intersecting X- and Y-directions. A rack 121 is formed along the rear end of the carrier body 120 in the X-direction, and a rack 122 is formed along one side of the carrier body 120 in the Y-direction. For moving the carrier boy 120 in the X-direction, the rack 121 is meshed with a pinion 124 which is rotated by a motor 123 mounted on the reader-printer body 21. For moving the carrier body 120 in the Y-direction, the rack 122 is meshed with a pinion 126 which is rotated by a motor 125 mounted on the reader-printer body 21.

Illustrated in FIG. 13 is the microfilm carrier 25 for roll films, including a carrier body 130 mounting thereon a couple of reels 131 and 132. The microfilm can be transported in the X-direction by rotating the reels 131 and 132. In order to move the carrier body 120 in the Y-direction, a rack 133 which is provided on the carrier body 130 is meshed with the pinion 126 which is rotated by the motor 125 mounted on the reader-printer body 21.

Figure 14:
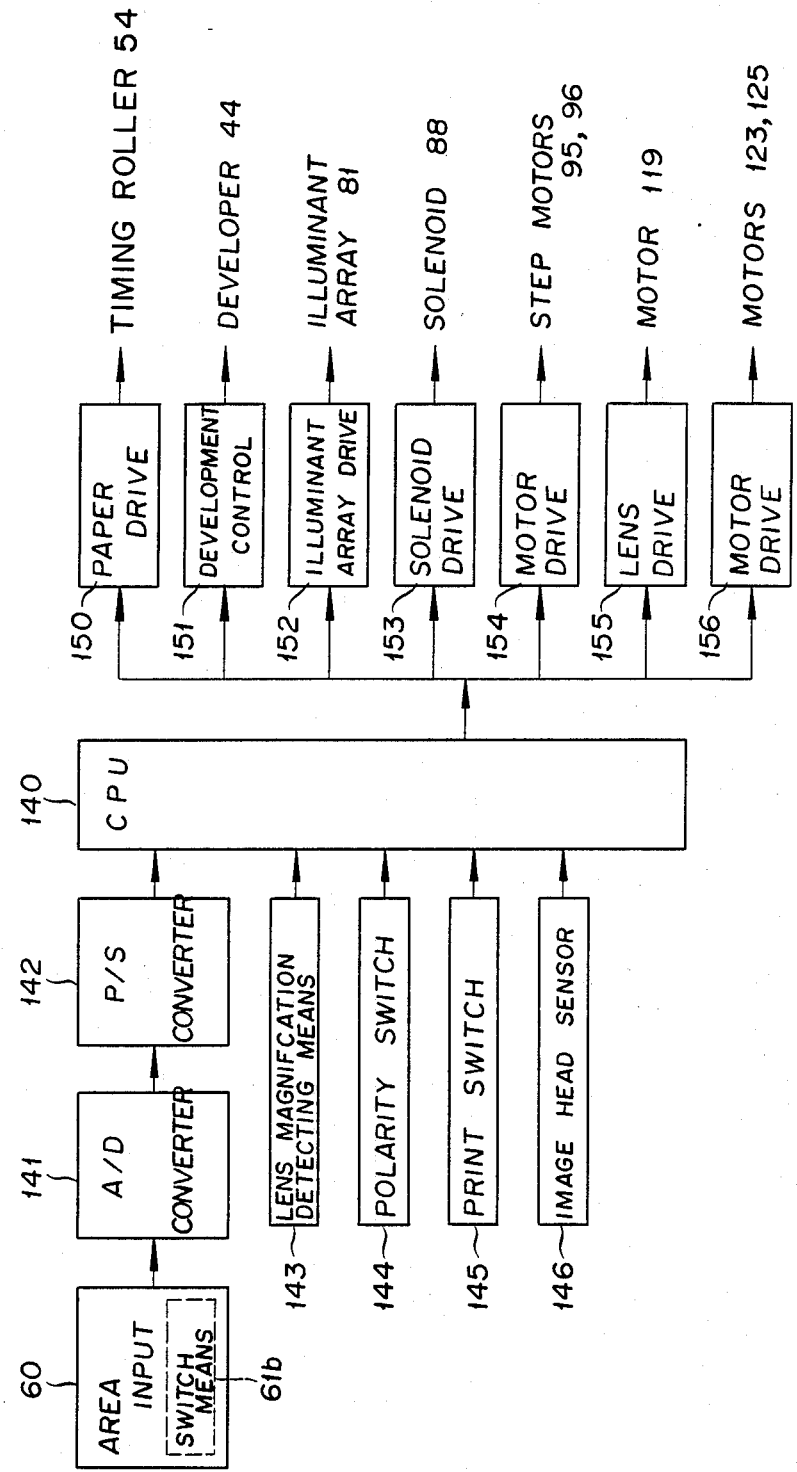
FIG. 14 is a diagram of a control system for the reader-printer according to the invention.

Referring to FIG. 14, there is illustrated in block diagram a control system for the reader-printer, which is controlled by a known CPU 140. The analog voltage signal from the area specifying portion 60 is converted into a digital signal by A/D converter 141, and sent to CPU 140 through P/S converter 142 which convert the parallel signal from the A/D converter into the serial signal. The input section 61b shown in FIG. 2 constitutes a switch means for switching the input state from a first state for specifying an editing area of a projected image on the screen to a second state for specifying an area for an edited image position on copying paper. The signal from this switch means 61b is also fed to CPU 140 as shown in FIG. 14. CPU 140 is also supplied with: a stepwise magnification signal in the form of a combination of binary signals produced by a lens magnification detecting means 143 in response to the signals from the sensors 119a to 119b in the zoom projection lens 29 shown in FIGS. 10 and 11; a signal from a polarity switch 144 which is operated by the operator depending upon whether the microfilm is positive or negative; and a signal from a print switch 145 which is operated by the operator for starting printing. The just-mentioned print switch 145 is provided on the control panel 24 on the front side of the reader-printer body 21. As shown in FIG. 1, a sensor 146 for detecting the leading end of the image, which is actuated by moving of mirror 31 and sends the signal from the sensor 146 to CPU 140.

CPU 140 is connected to: a paper drive 150 which sends operating signals to the timing roller 54 shown in FIG. 1 in accordance with the signal from sensor 146; a developer control 151 which supplies operating signals to the developer 44; an illuminant array drive 152 which supplies operating signals to the illuminant array 81 shown in FIGS. 9A and 9B; a solenoid drive 153 which supplies operating signals to the solenoid 88 shown in FIGS. 7 and 8; a motor drive 154 which supplies operating signals to the two step motors 95 and 96 shown in FIG. 7. Further, as shown in FIG. 14, a lens drive 155 which supplies operating signals to the motor 119 shown in FIGS. 10 and 11, and a motor drive 156 which supplies operating signals to the motors 123 and 125 of FIGS. 12 and 13 are also connected to CPU 140.

Following are the procedures of image editing, trimming, and hard-copying a image recorded on a negative film by means of the above-described reader-printer.

FIG. 15 diagrammatically shows the total area 0-A-C-B of an image which is projected on the screen 22 of the reader-printer 21. When it is intended to shift and print only the hatched area I-II-III-IV of the whole projected image area to and at an area hatched by broken line, the operator presses the input switch 61a of FIG. 2 and then specifies the editing area, namely, the first area 161 by pressing the points I, II, III and IV on the contact film 59 with a point pen which is not shown, thereby sending coordinates corresponding to the input points to CPU 140. The input of this first area is possible only in the reader mode in which an image recorded on a microfilm is projected on the screen 22, and rendered infeasible by a signal from CPU 140 in the print mode in which an image is being printed on copying paper.

After specifying the first area 161 in the above-described manner, the operator presses the input switch of FIG. 2, namely, the input mode switch 61b to send its signal to CPU 140, whereupon it becomes possible to specify the second area 162 to which the image of the first area 161 is to be shifted relative to copying paper. Similarly to the input of the first area 161, the second area 162 is specified by pressing the points I', II', III', and IV' with a point pen, sending the coordinates of these points to CPU 140.

As shown in FIG. 15, CPU 140 calculates the distances xl and yl between the first area 161 specified for editing and the second area 162 to which the first area is to be shifted, sending shift signals to the motor drive 156. On receipt of these signals, the motor drive 156 drives the motors 123 and 125 to shift the first area 161, which is projected on the screen 22, to the second area 162 on the screen in a case where the film carrier 25 is of the type as shown in FIG. 12, displacing the carrier body 120 in the X-and Y-directions by precalculated distances. In this case, the carrier 120 is shifted by a distance corresponding to the distance of shift on the screen 22 multiplied by the inverse number of the lens magnification rate. This shift distance of the carrier body 120 is calculated by CPU 140 on the basis of the magnification signal from the lens magnification detecting means 143.

Although the first and second areas 161 and 162 are specified by way of four corner points, I, II, III and IV, or I', II', III' and IV', they may be specified by pressing two diagonal points, I and IV or II and III, and I' and IV' or II' and III'. Alternatively, the second area may be specified by pressing only one point like an intersecting point of a diagonal line. In case the first and second area is specified by pressing only one point, it becomes possible to preclude errors of specifying a second area of a range different from that of a first area.

In case it is desired to print the image of the first area on copying paper on a scale different from that of the first area, for example, the second area is specified to position the first area 161 of FIG. 15 at the center of the screen 22, enlarging the second area 162 such that it is projected over the entire screen 22. The specified image area can be printed on copying paper in this state by altering the magnification rate of the zoom projection lens. Reductions of the specified image area can be attained in a similar manner. In such a case, the linear magnification ratios of the first area to the second area in the X- and Y-directions are calculated by CPU 140 to compute a projecting magnification ratio for correction. This projecting magnification ratio is obtained by multiplying the current projecting magnification ratio with the corrective magnification ratio. The corrective magnification signal from CPU 140 is sent to the lens drive 155 to drive the zoom ring 110 through the motor 119 to achieve the altered lens magnification rate. Simultaneously, CPU 140 calculates the values of new coordinates resulting from the alteration of the lens magnification ratio as well as the distance between the two areas after the alteration of magnification, sending signals to the motor drive 156 to move the carrier body 120 in conformity therewith.

In this manner, the present invention can be applied even in a case where the first and second areas 161 and 162 differ from each other in dimension. Where the linear magnification ratios in the X- and Y-directions differ from each other, defects in the ultimate printed images can be prevented by employing a smaller one of the magnification ratios for the alteration.

In a case where the two areas are specified in an altered magnification rate as mentioned hereinbefore, it is desirable to specify the respective areas by way of 4-point or 2-point destination although alteration of the magnification rate is also possible in case of the above-mentioned one-point designation. In the latter case, the first area 161 to be shifted, namely, the editing area is specified by one point, and its maginification ratio to the image printing is keyed in by a numerical input means which is not shown. A lens magnification rate in conformity with such an area ratio is computed by CPU 140 to alter the lens magnification rate of the zoom projection lens 29. Simultaneously, the values of the afore-mentioned coordinates and the distance between the two areas are computed to move the carrier body 120 and shift the first area 161 to the second area 162.

The zoom projection lens 29 is adapted to change the projecting magnification rate in a stepless manner, but it may be arranged to set the magnification rate at a required number by automatically changing a plural number of monofocus lenses. For example, it may employ a plural number of monofocus lenses which are mounted on a turret disk in positions radially equidistant from the rotation center thereof, setting an arbitrary monofocus lens in a projecting position by rotating the turret disk. In such a case, however, the alteration of the magnification rate is possible only stepwise correspondingly to the number of the monofocus lenses, so that it becomes necessary to select a lens with a magnification rate which is most close to and smaller than a projecting magnification rate calculated for alteration. By so doing, it becomes possible to print images of good quality and without missing portions.

Following are the procedures for printing on copying paper an image which is projected in the first area 161 on the screen with shifting to the position of the second area 162 on copying paper.

Whether the microfilm on the film carrier 25 is negative or positive is detected by a polarity switch 144 and its signal is sent to CPU 140.

When the microfilm is negative, that is to say, in case of N - P, the image of the first area alone is printed on the copying position of the second area in an edited form by a shutter control which controls the open period of the shutters 85 and 86 shown in FIGS. 8 and 9 and by a developing bias voltage control which energized the developer 44 shown in FIG. 1.

Upon closing a print switch 145, a signal is sent from CPU 140 to the motor drive 154 to drive the step motors 95 and 96 of FIGS. 7 and 8 to shift the shutters 85 and 86 to positions corresponding to X'1 and X'2 in FIG. 15. As the first mirror 31 is moved to a position indicated at 31b in FIG. 1, the afore-mentioned image leading end sensor 146 is turned on, energizing the solenoid 88 of FIG. 7 simultaneously with the exposure start timing. By energization of the solenoid 88, the exposure is effected only between X'1 and X'2 to form on the photosensitive drum 41 a latent image of the area between these positions, while masking other areas by the shutters 85 and 86. As a result, the image forming in the X-direction is controlled.

Figure 16:
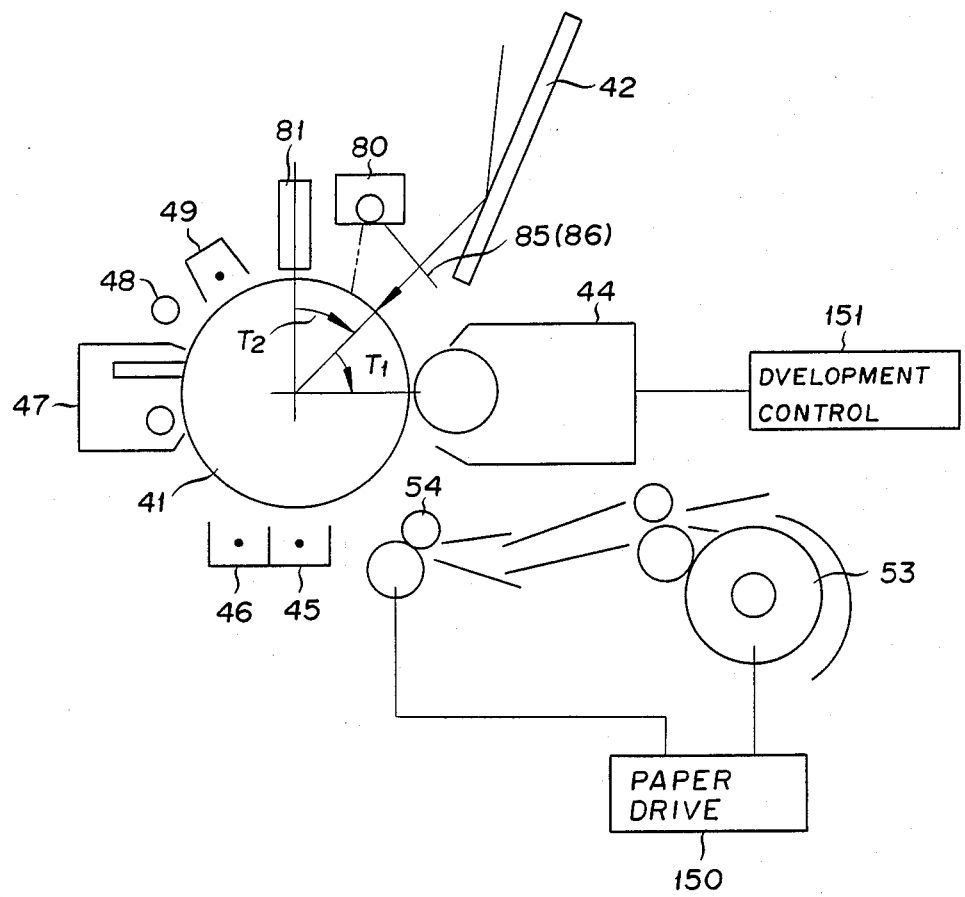
FIG. 16 is an enlarged illustration showing the positions of developer, light emitting element array and shutter unit relative to the photosensitive drum.

The control of image forming in the Y-direction is attained by controlling the on-off timing of the developing bias to be applied to the developer 44 shown in FIGS. 1 and 16 according to the results of arithmetic operations by CPU 140. Namely, as shown in FIG. 17B, the developing bias is turned on upon lapse of time $T1+(Y'1/V)$ from the time point when the sensor 146 is turned on by detection of the leading end of the image, cutting off the developing based upon lapse of time $(Y'2-Y'1)/V$ from the time point when the developing biase was turned on. Here, T1 is the time length required to reach the development from the exposure, and V is the velocity of the copying paper. By controlling the developing bias with such timing, only the electrostatic latent image between Y'1 and Y'2 is developed, leaving other areas in undeveloped state. Thus, the image is printed on copying paper in a position corresponding to the second area 162 of FIG. 15.

On the other hand, in P-P printing, namely, in a case where an image is printed on copying paper from a positive microfilm which is retained on the film carrier 25, the image which has been shifted to the second area is printed by controlling on-off of the illuminant elements 100 shown in FIGS. 9A and 9B, as will be described hereinlater. When it is desired to print on copying paper an image which has been shifted to the second area as indicated by broken line hatching in FIG. 15, the data necessary for editing the image are sent to CPU 140 on the start of the printing action in the same manner as in the N-P printing. In this case, all of the illuminant elements are lit simultaneously with turn-on of the print switch 145 as shown in FIG. 17C. Since the illuminant element array 81 and the developer 41 are located in the positions of FIG. 16 relative to the photosensitive drum 41, the illuminant elements 100 between X'1 and X'2 are turned off upon lapse of time $(Y'1/V)-T2$ from a time point when the sensor 146 is turned on by detection of the leading end of the image, and turned on again upon lapse of time $(Y'2-Y'1)/V$. Here, T2 is the time length required to reach the exposure from the illuminant array 81. The illuminant elements in the areas other than the above-mentioned area are lit continuously. The electrostatic latent image on the photosensitive drum 41 is erased in those portions which correspond to the lighted illuminant elements 100, forming an electrostatic latent image on the photosensitive drum 41 only in those portions which face unlit illuminant elements 100. In this instance, if the editing mode specified by way of the input section 61c is "trimming", the illuminant elements 100 outside the editing area are lit. In case of masking, the illuminant elements 100 in the editing area are lit. Shown in FIG. 17A is a timing shaft for controlling the developing bias and so forth when printing all of the picture image which is projected on the screen 22. The timing of turning on the developing bias in the afore-mentioned P-P printing is same as in the ordinary copy mode shown in FIG. 17A, holding the solenoid 88 continuously in off state. In this manner, desired edited images can be obtained also in the P-P mode.

In the foregoing embodiment of the invention, the image of the first area 161 which is specified for printing is shifted in the X- and Y-directions on copying paper to relocate to the position of the second area 162. However, it is also possible to shift the image on the screen only in the X-direction, while effecting a shift in the Y-direction by varying the timing of turning on the timing roller 54. In such a case, if the distance of the desired image shift in the Y-direction is L, this can be attained by turing on the timing roller 54 with a delay of $L/V$ from the ordinary on timing.

Instead of the contact sheet 59 of transparent material which is used to specify image areas in the above-described embodiment, there may be employed a coordinate specifying means including numerical input keys or the like. Alternatively, a member for specifying a relocating area may be provided separately from a member for specifying a first editing area if desired.

Further, although the embodiment shown in the drawings is adapted to provide only "trimming" in the N-P image editing mode, "masking" becomes feasible also in the N-P image editing by provided a pair of light masking plates in the light path and partially masking the projected optical image by turning one masking plate relative to the other one. Of course, in this case the edited image can be shifted to a desired position on copying paper by the above-described arrangement.

The reader-printer according to the invention permits to print an image of an arbitrarily selected area in a desired position on copying paper, contributing to keep confidential information on microfilms from exposure and to product copied images which are extremely easy to view.

What is claimed is:

1. A reader-printer of the type which is adapted to project a recorded image of a microfilm on a screen and to print the image on a sheet of paper by projecting the image on a photosensitive medium, said reader-printer comprising:
    a first specifying means for specifying a first area to be printed on the paper from an image projected on said screen;
    a second specifying means for specifying a second area located in a position different from that of said first area specified by said first specifying means;
    a detection means for detecting the positional relationship between said first and second areas;
    a shift means responsive to said detection means for shifting the projected image of said microfilm in the longitudinal and transverse directions with respect to said paper; and
    an image forming means for forming the image defined within said first area on said paper in a position corresponding to said second area.

2. The reader-printer of claim 1, wherein said first specifying means is constituted by an area specifying member in the form of a transparent sheet attached coextensively on said screen and adapted to produce signals corresponding to the positions where said sheet is pressed for selection of said area.

3. The reader-printer of claim 2, wherein said area specifying member is provided with a couple of insulating transparent films each having a multitude of conductive wires laid thereon in a predetermined pitch, the conductive wire sides of said films being overlapped one on the other through spacers with the conductive wires on one film disposed perpendicularly to the conductive wires on the other film to form a matrix-like contact group.

4. The reader-printer of claim 2, wherein said area specifying member is provided with a couple of transparent films each having a transparent resistor film on the surface thereof, the resistor film sides of said transparent films being overlapped one on the other through spacers.

5. The reader-printer of claim 2, wherein said first specifying means is adapted to set as said first area a rectangular area having a diagonal line coinciding with a segment connecting two specified points on said screen.

6. The reader-printer of claim 1, wherein said second specifying means is adapted to set, on the basis of one specified point on said screen, a second area same as said first area in size but different from the latter in location.

7. The reader-printer of claim 1, wherein said image forming means forms a positive image on said paper no matter whether said microfilm is a negative or positive film.

8. The reader-printer of claim 7, wherein said image forming means is provided with means for checking whether said microfilm is a positive or negative film.

9. The reader-printer of claim 7, wherein said image forming means is provided with blocking members for partially masking the microfilm image to be projected on said photosensitive medium according to the setting of said second area when said microfilm is a negative film.

10. The reader-printer of claim 7, wherein said image forming means is provided with means for partially irradiating said photosensitive medium with light according to the setting of said second area when said microfilm is a positive film.

11. The reader-printer of claim 1, further comprising a developing means located in the vicinity of said photosensitive medium, means for applying a bias voltage to said developing means, and means for controlling the operation of said bias voltage applying means according to the setting of said second area.

12. The reader-printer of claim 1, wherein said shift means is provided with a carrier for holding said microfilm and means for moving said carrier in two perpendicularly intersecting directions.

13. The reader-printer of claim 1, wherein said shift means is provided with means for reciprocating an elongated microfilm in a predetermined direction, and means for moving said film reciprocating means in a direction perpendicular to the reciprocating movement of said microfilm.

14. The reader-printer of claim 1, further comprising means for varying the magnification rate of microfilm image projection, and means for controlling said magnification varying means by comparison of dimensions of said first and second areas.

15. The reader-printer of claim 14, wherein said magnification varying means incorporates a zoom lens for steplessly varying said magnification rate.

16. A reader-printer of the type which is adapted to project a recorded image of a microfilm on a screen and to print the image on a sheet of paper by projecting the image on a photosensitive medium, said reader-printer comprising:

a transparent coordinate input means mounted on the front side of said screen and adapted to produce coordinate signals corresponding to pressed positions;

an area setting means operable in a first mode of setting a first area t be printed from a projected image on said screen according to said coordinate signals from said coordinate input means and second mode of setting a second area for forming an image on the paper;

means for specifying the mode of said area setting means;

means for detecting the positional relationship between said first and second areas;

a shift means for shifting the image of said microfilm in the longitudinal and transverse directions of said paper according to the results of operation of said detection means; and means for forming the image defined within said first area on said paper in a position corresponding to said second area.

17. The reader-printer of claim 16, where in said coordinate input means is provided with a couple of insulating transparent films each having a multitude of conductive wires laid thereon in a predetermined pitch, the conductive wire sides of said films being overlapped one on the other through spacers with the conductive wires on one film disposed perpendicularly to the conductive wires on the other film to form a matrix-like contact group.

18. The reader-printer of claim 16, wherein said coordinate input means is provided with a couple of transparent films each having a transparent resistor film on the surface thereof, the resistor film sides of said transparent films being overlapped one on the other through spacers.

19. The reader-printer of claim 16, wherein said area setting means is adapted to set as said first area a square area having a diagonal line coinciding with a segment connecting two points specified by coordinate signals from said coordinate input means.

20. The reader-printer of claim 16, wherein said area setting means is adapted to set, on receipt of a coordinate signal of one point from said coordinate input means, a second area same as said first area in size but different from the latter in location.

21. The reader-printer of claim 16, wherein said image forming means is adapted to form a positive image on said paper no matter whether said microfilm is a negative or positive film.

22. The reader-printer of claim 21, wherein said image forming means is provided with means for checking whether said microfilm is a positive or negative film.

23. The reader-printer of claim 21, wherein said image forming means is provided with light masking member for partially blocking the microfilm image to be projected on said photosensitive medium according to the setting of said second area when said microfilm is a negative film.

24. The reader-printer of claim 21, wherein said image forming means is provided with means for partially irradiating said photosensitive medium with light according to the setting of said second area when said microfilm is a positive film.

25. The reader-printer of claim 16, wherein said image forming means further comprises a developing means located in the vicinity of said photosensitive medium, means for applying a bias voltage to said developing means, and means for controlling the operation of said bias voltage applying means according to the setting of said second area.

26. The reader-printer of claim 16, wherein said shift means is provided with a carrier for holding said microfilm and means for moving said carrier in two perpendicularly intersecting directions.

27. The reader-printer of claim 16, wherein said shift means is provided with means for reciprocating an elongated microfilm in a predetermined direction, and means for moving said film reciprocating means in a direction perpendicular to the reciprocating movement of the microfilm.

28. The reader-printer of claim 16, further comprising means for varying the magnification rate of microfilm image projection, and means for controlling said magnification varying means by comparison of dimensions of said first and second areas.

29. The reader-printer of claim 28, wherein said magnification varying means incorporates a zoom lens for steplessly varying said magnification rate.

30. A reader-printer of the type which is adapted to project a recorded image of a microfilm on a screen and to print the image on a sheet of paper by projecting the image on a photosensitive medium, said reader-printer comprising:
   a first specifying means for specifying a first area to be printed on the paper from an image projected on said screen;
   a second specifying means for specifying a second area located in a position different from that of said first area specified by said first specifying means;
   a detection means for detecting the positional relationship between said first and second areas;
   an image shift means responsive to said detection means for shifting the projecting image of said microfilm in a direction perpendicular to the direction of transport of the paper;
   a paper transport control means responsive to said detection means for controlling a paper transport operation; and
   an image forming means for forming the image defined within said first area on the paper in a position corresponding to said second area.

31. The reader-printer of claim 30, wherein said first specifying means is constituted by an area specifying member in the form of a transparent sheet attached coextensively on said screen and adapted to produce signals corresponding to the positions where said transparent sheet is pressed for selection of the area.

32. The reader-printer of claim 30, wherein said second the form of a transparent sheet attached coextensively on said screen and adapted to produce signals corresponding to the positions where said transparent sheet is pressed for selection of the area.

33. A reader-printer of the type which is adapted to project a recorded image of a microfilm on a screen and to print the image on a sheet of paper by projecting the same on a photosensitive medium, said reader-printer comprising:
   a first specifying means for specifying a first area to be printed on the paper from an image projected on said screen;
   a second specifying means for specifying a second area located in a position different from that of said first area specified by said first specifying means;
   a first detection means for detecting the positional relationship between said first and second areas;
   a second detection means for detecting the dimensional relationship between said first and second areas;
   a magnification varying means responsive to said second detection means for varying the magnification rate of the microfilm projection;
   a shift means responsive to said first and second detection means for shifting the projecting image of said microfilm in the longitudinal and transverse directions with respect to the paper; and
   an image forming means for forming the image defined within said first area on the paper corresponding to said second area.

34. The reader-printer of claim 33, wherein said magnification varying means incorporates a zoom lens operable to steplessly vary said magnification rate of the microfilm projection.

* * * * *